United States Patent [19]

Danyliw

[11] 4,013,273
[45] Mar. 22, 1977

[54] METHOD OF, AND MIXER FOR INTIMATE BLENDING OF FINE, DRY, PARTICULATE SOLID MATERIALS WITH MOIST WET OR SLURRIED PARTICULATE SOLID MATERIALS

[75] Inventor: George Jack Danyliw, Sudbury, Canada

[73] Assignee: The International Nickel Company, Inc., New York, N.Y.

[22] Filed: Oct. 30, 1974

[21] Appl. No.: 519,128

[30] Foreign Application Priority Data

Dec. 19, 1973  Canada .............................. 188485

[52] U.S. Cl. .................................. 259/8; 416/203
[51] Int. Cl.² .......................................... B01F 7/20
[58] Field of Search ............. 259/7, 8, 9, 10, 182, 259/22–26, 42–46, 65–69; 416/203

[56] References Cited

UNITED STATES PATENTS

| | | | |
|---|---|---|---|
| 1,560,826 | 11/1925 | Kirschbraun | 259/7 |
| 2,592,709 | 4/1952 | Kinnaird | 259/8 |
| 2,787,448 | 4/1957 | Fawcett | 416/203 |

*Primary Examiner*—Leonard D. Christian
*Assistant Examiner*—Alan Cantor
*Attorney, Agent, or Firm*—Miriam W. Leff; Ewan C. MacQueen

[57] ABSTRACT

A blender is provided which is comprised of an impeller having at least three sets of blades, a first set of blades positioned near the inlet of the blender and a second set of blades positioned near the outlet of the blender are radially extending and pitched, said first and second set of blades having a differential in the average pitch relative to each other. The third set of blades positioned between the inlet and outlet sets, which may be pitched or unpitched, include blades which are curved toward both the first and second set of blades. The blender has particular application to the smelter art and is useful for the continuous blending and agglomeration of fine particulate materials.

17 Claims, 3 Drawing Figures

METHOD OF, AND MIXER FOR INTIMATE BLENDING OF FINE, DRY, PARTICULATE SOLID MATERIALS WITH MOIST WET OR SLURRIED PARTICULATE SOLID MATERIALS

This invention relates to a blender and to a method of blending particulate solids. In particular the invention relates to a blender useful in the intimate blending of fine, dry particulate solid materials with moist, wet or slurried particulate solids.

This invention has particular application to, and has been derived from experience in, the smelter art. In a modern smelter, certain fine particulate materials, for example, flue dusts, are returned to the smelter. The handling of these dusts has long been a problem. The dusts have a very fine particle size and exhibit varying rheological characteristics. In addition, the dusts are formed in high volume, and it has become increasingly important to collect them for the purposes of air pollution abatement and for the recovery of metal values. The latter reason is particularly important in the extraction of metals such as nickel, copper, cobalt and precious metals from sulphides.

In the case of the extraction of metal values from sulphides, it is a common practice in commercial units to return the dusts, which have a high oxide content, as dusts to the smelter. These dusts are not only difficult to collect but also, once collected, they are difficult to handle in the smelter. A relatively high percentage of this recirculated dust may again report as dust and a circulating load of dust builds up resulting in higher dust losses from the smelter. A further problem is that the fine oxide particles do not assimilate with the sulphides in the smelter and much of the metal values are lost in the dump slag. The volume of dusts that must be handled is quite large. In a typical process for the extraction of metals from sulphides, for example, the flue dusts amount to about 10–15% of the smelter capacity, so that the loss in metal values can be substantial. The present invention concerns a method and apparatus for effective assimilation of flue dusts into the smelter circuit. The method involves both the composition and the physical form of the recycle material. With respect to the composition of the flue dusts, in particular flue dusts evolved in the extraction of metal values from sulphides, it has been found that by mixing with the dusts suitable sulphides, in amount sufficient to sulphidize the oxide values in the dusts, the recovery of metal values can be increased substantially. To optimize the recovery the dusts are compacted into suitable shapes, preferably briquettes, before being returned to the smelter. A suitable amount of moisture must also be incorporated into the mixture of flue dusts and sulphides to insure the production of quality briquettes from the mixture of fine dust particles and sulphides, that is briquettes which exhibit maximum resistance to degradation due to mechanical handling and thermal shock.

One aspect of the problem concerns the means by which the fine particles and moisture, and any other material which may be added thereto, are blended together. To be commercially satisfactory, the blender should effect the mixing homogeneously and in suitable ratios. Furthermore, the mixer should have a high throughput capacity with minimum residence time and should be capable of operating on-stream and continuously.

Conventional mixing and blending devices have not proved satisfactory in blending solids in the smelter art. In particular, conventional mixing devices such as twin shell, ribbon, batch mullers, single and twin rotar mixers or variations of these have been employed in the above blending operation but have proved to be unsatisfactory. Some drawbacks to these units include the necessity of operating them in batch operation, high maintenance requirements and expense, inadequate blending, difficulties in sealing which leads to problems with dust in the plant and a tendency to plugging and thus reduced throughput.

Of other conventional mixers, circulation mixers are essentially suitable for batch blending or mixing of solid-liquid or liquid-liquid components where the liquid to solid ratio is sufficiently high to permit the liquid phase to act as a vehicle. These units are generally installed on or within a holding batch. For these reasons circulation mixers are considered unsuitable for the blending of solids.

The present invention avoids the above disadvantages and, in particular, provides a blender capable of continuous on-stream operation and also capable of handling the very large volume of materials that must be treated in smelting processes. The blender of the present invention has particular application in the smelter art but is generally applicable in any situation where a dry powdered material is to be moistened so that it can be subsequently processed. These other fields of application include the de-dusting of powdered materials, incorporating of solid particulate or liquid reagents or additives in loose friable, particulate materials, homogenizing or breaking up lumps or agglomerates of soft materials. There are, in addition, a wide number of flue dusts that may be blended with sulphides in the blender of the present invention.

More particularly, the present invention is a blender that comprises an open ended, substantially tubular enclosure having an inlet end and an outlet end and an impeller positioned within the enclosure. The impeller has a number of blades mounted on it. Adjacent the inlet end of the impeller there is positioned a first set of blades, which are pitched. Adjacent the outlet end is a second set of blades that are pitched but whose average pitch is less than the average pitch of the first set of blades. Between the first and second set of blades is a third set of blades that are pitched or unpitched and whose principal function is the blending and shearing of the mass being blended in the blender. In the event the third set of blades (or any one or more of said blades) are pitched, the pitch is less than the average pitch of either the first or second set of blades.

The present invention also includes a method of blending particulate solids that comprises introducing the solids to be blended into the inlet end of the above blender. As the solids pass through the blender the impeller is rotated at such a speed that the average tip speed of the blades is greater than 2,500 feet per minute. To provide compacting of the feed material in the blender, the blades adjacent the outlet and those adjacent the inlet are pitched to a different degree. The differential in pitch is adjusted so that the blades adjacent the inlet advance material into the space between the first and second set of blades faster than the second set of blades can remove the materials from the blender. The third set of blades shears and mixes the blend as it passes between the first and second set of blades. Where the intermediate blades are pitched, it is believed that there may be a change in the distribution of the compacting action between the initial and advanced sections of the blender.

Another important feature of the blender is the low clearance between the enclosure and the tips of the blades. If the gap between the blade tips and enclosure is too great, the material which is not free flowing has a tendency to stick to the walls. With respect to the radially extending blades, the clearance is typically about ⅛ inch. With respect to the curved blades, it is important only to ensure that they do not contact the walls of the enclosure during operation.

While it is not mandatory that the mixer be positioned vertically in use, it is preferred that the mixer be placed so that the flow through the mixer is in an essentially downward direction.

An embodiment of the invention is illustrated in the accompanying drawings in which.

Figure 1:
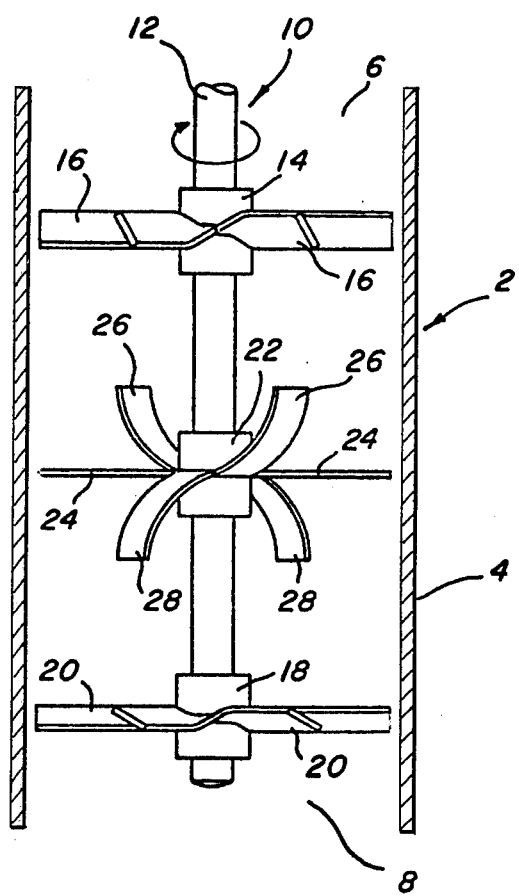
FIG. 1 is a partial section through a blender according to the invention.

FIG. 1 illustrates a blender 2 comprising an open ended tubular enclosure 4 having an inlet end 6 and an outlet end 8. An impeller 10 is positioned within the enclosure 4. Impeller 10 comprises a rotatable spindle 12, positioned axially within the enclosure 4. The spindle 12 has three sets of blades mounted on it. A first set 14 is positioned relatively close to the inlet end 6 of the enclosure 4. Blades 16 of the first set 14 all extend radially from the spindle 12 and all are pitched. A second set of blades 18 is positioned relatively close to the outlet end 8 of the enclosure 4. The blades 20 of the second set 18 extend radially from the spindle 12 and are pitched but at an angle less than the angle of the first set 14. A third set of 22 blades is positioned between the first and second set of blades. The blades of the third set are all unpitched. The blades 24 of the set 22 extend radially from spindle 12 but blades 26 are curved towards the first set 14 of blades and blades 28 are curved towards the second set 18 of blades 20.

The mounting of the sets of blades 14, 18 and 22 on the rotatable spindle 12 and the pitching of the first set 14 of the blades at an angle greater than the pitch angle of the second set 18, ensure that, in use, particulate solids introduced into the blender 2 at the inlet 6 are sheared and compacted during their path through the blender. In particular, the greater pitch of the blades 16 of the first set 14 ensures the material is fed into that part of the blender 2 between the sets 14 and 18 of blades quicker than it can be removed by the blades 20 of set 18. This ensures a certain compacting of the material. Further, blades 16 and 20 shear and mix the mass but the main shearing and mixing is carried out by blades 24, 26 and 28 of the third set 22 of blades, in particular curved blades 26 and 28. Preferably the pitch of each blade of a set of pitched blades is the same as that of the other blades of the set, principally to ensure dynamic balance. In the illustrated embodiment there are six blades 16 in the first set 14 six blades 20 in the second set 18 and eight blades 26 and 24 and 28 in the third set 22. The eight blades in the third set comprise four unpitched and uncurved blades 24 two curved blades 26 and two curved blades 28.

In the illustrated embodiment the pitch angles are 60° for the first set 14 of blades and 30° for the second set 18 of blades. Other pitches that have been found useful are 25° for the first set with 18° for the second set and 45° for the first set with 30° for the second set.

As indicated previously, it is not desirable that large amounts of material to be blended should pass between the tips of the blades 16, 20 and 24 and the enclosure 4. Thus the clearance between the enclosure 4 and the tips of the blades 16, 20 and 24 is kept low and, typically, is about ⅛ of an inch.

Figure 2:
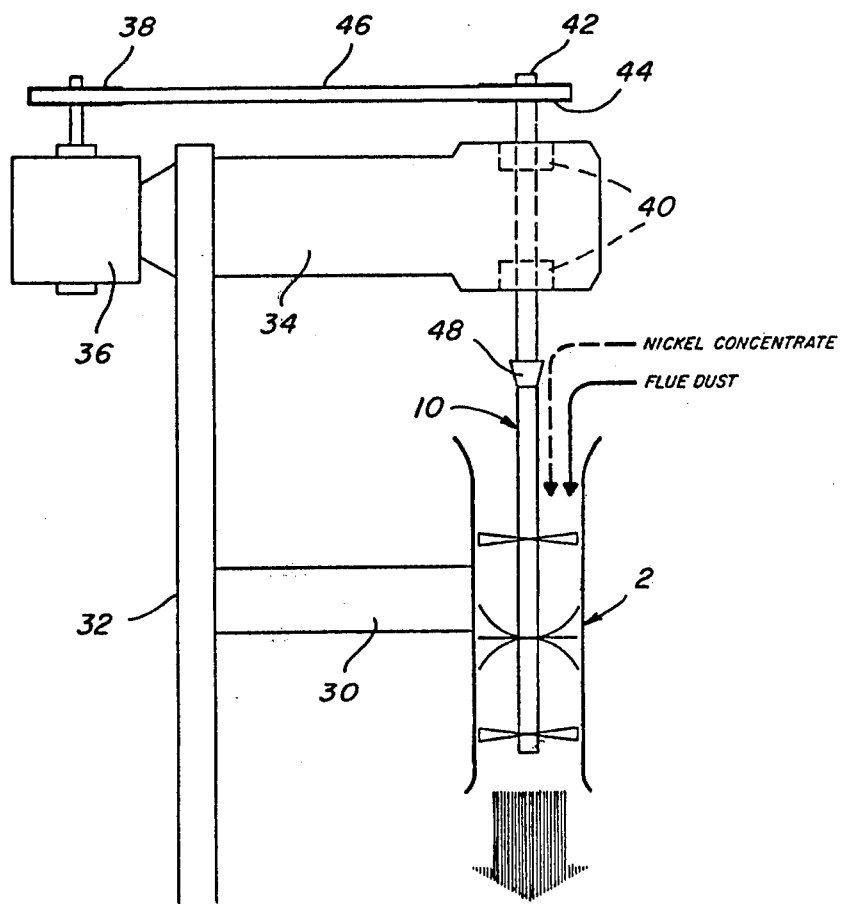
FIG. 2 illustrates the blender of FIG. 1 with associated mounting and drive means.

FIG. 2 illustrates the blender 2 illustrated in FIG. 1 supported on a limb 30 of a stand 32. The stand 32 has a further limb 34 at one end of which is mounted an electric motor 36 provided with a drive wheel 38. At the other end of the limb 34 are bearings 40 supporting a drive shaft 42 upon which is mounted a drive wheel 44. A belt 46 extends from drive wheel 38 of electric motor 36 to drive wheel 44 of drive shaft 42. A connection 48 joins drive shaft 42 to shaft 12 of the impeller 10 of the blender 2.

In operation, the electric motor is driven at such a speed that the tips of the blades on the impeller 10 move at a speed greater than 2,500 feet per minute.

In the illustrated embodiment of FIG. 2, nickel concentrate and flue dusts are fed into the tubular enclosure 2. Rotation of the impeller 10 compacts and blends the two materials in the blender 2 and, upon leaving the blender 2, the materials are well blended and compacted. They are then suitable for briquetting to return them to the smelter.

The blender of the present invention may be used with a wide variety of particulate solid materials. In general, the particle size distribution of the materials is such that any materials passing through a 20 mesh sieve can be treated without difficulty. Coarser fractions are liable to cause excessive abrasion and damage the blades and the tubular enclosure. However with soft materials particle sizes larger than 20 mesh can also be treated as abrasion of the apparatus and damage of the blades is less likely with soft materials.

Water may be added to the materials to be blended and, in general, the water may be added in any amount up to the amount in which it could be said that the product is no longer a friable, loose, particulate material and the fluid has begun to act as a vehicle. In experimental tests, the units of the present invention have produced blends ranging in moisture from about 2.7 to about 13%. Moisture levels in the material depend upon the nature of the feed materials.

Water may be added, for example by any one of the following three ways:

First, the required free water may be piped to exit above the first set of blades 14, preferably in the proximity of the spindle 12.

Secondly, drive shaft 42 and spindle 12 may each be provided with an internal passage. The required free water may be introduced from a metering-pressure delivery system through a suitable seal into the drive shaft 42. The water passes from the drive shaft 42 into the spindle 12. Spindle 12 is provided with orifices that connect with the internal passage. The water passes through these orifices into the mix in a fine spray Preferably the orifices are positioned immediately below the sets of blades 14 to provide homogeneous distribution of water.

Thirdly, the required free water may be added to the particulate solids before they are fed into the blender.

Of course it may not be necessary to add water. By employing a slurry having an appropriate water content in an appropriate ratio of slurry to dry dust, desired product moisture tenors may be realized without the input of additional free water.

Figure 3:
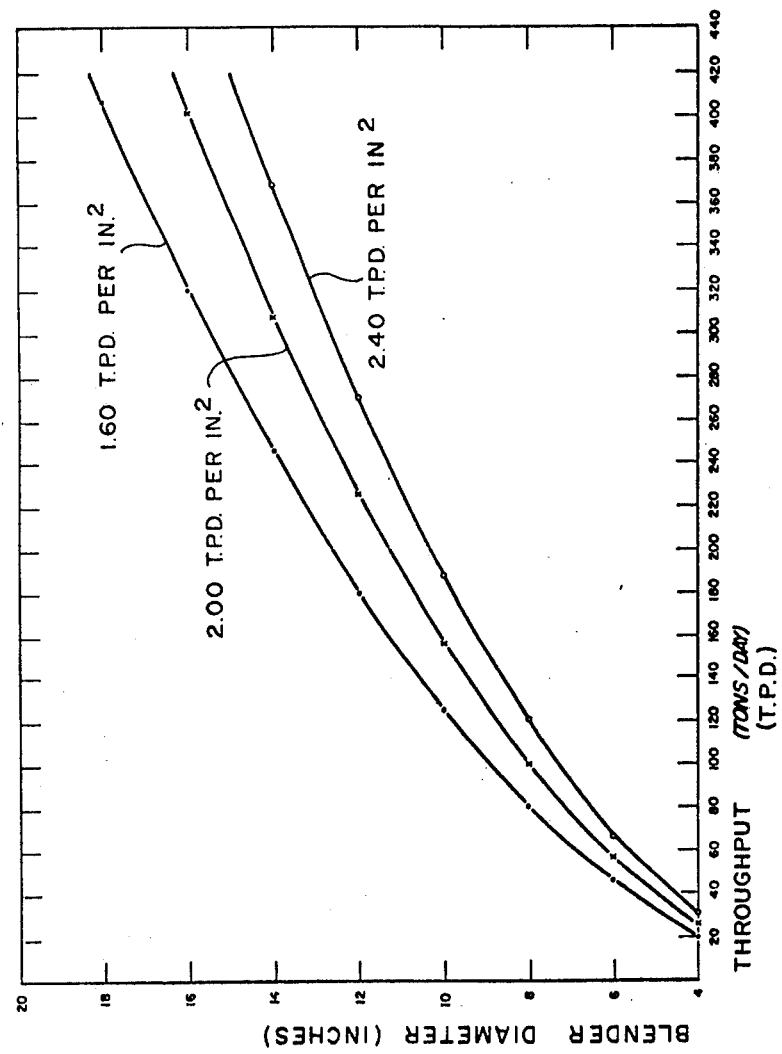
FIG. 3 is a graph relating blender diameter and throughput.

The dimensions of the blender and the materials from which it may be made may vary widely. The dimensions will depend on the properties of the input material, and on the blended product and throughput required. However, using a design factor of 2 tons per day per square inch of cross-section, FIG. 3 permits a tentative estimate of blender diameter. The graph of FIG. 3 relates blender diameter in inches to daily throughput in tons/day.

The materials from which the blender can be made vary with intended use. For example corrosive service may dictate the use of stainless steels, plastics, etc. Abrasive service may require employing suitable alloys in diverse ways such as hard surfacing the impeller blades. A glass tube housing has been used in a laboratory prototype, principally as a matter of expediency. Obviously a commercial unit could employ a tubular housing fabricated from any suitable and formable material. However there could be commercial applications where a tempered glass housing would be desirable, for viewing purposes, for example, or in corrosive service.

Use of the blender of the present invention permits on-stream, high throughput capacity with minimum residence time of the material in the blender. The material to be blended is also driven through the blender by an action that also acts to blend. The blender is self-cleaning and capable of operating under frequent shutdown and startup cycles. The blender is a simple design and is thus easily maintained. Further the blender may be of corrosion and abrasion resistant material thus providing long life.

Results obtained using blenders according to the present invention are illustrated in the following example:

EXAMPLE

Flue Dust and sulphide filter cake were fed into a 4 inch diameter laboratory size blender according to the present invention operating at a blade tip speed of 4000 feet per minute. Table I records results of the test.

TABLE 1

| Feed | Wt.% | STAGE & BLADE PITCH | | | BLENDED PRODUCT | |
|---|---|---|---|---|---|---|
| | | 1st | 2nd | 3rd | Tons/Day | %Moisture |
| Flue Dust | 80 | 25° | 0° | 18° | 14 | 2.7 |
| Sulphide Filter Cake | 20 | | (Arched) | | | |
| Flue Dust | 77 | | | | | |
| Sulphide Filter Cake | 19 | 45° | 0° | 22° | 16 | 7.0 |
| Moisture | 4 | | (Arched) | | | |
| Flue Dust | 73 | 60° | 0° | 30° | 30 | 8.5 |
| Sulphide Slurry (66% Solids) | 27 | | (Arched) | | | |

It was found that the mixtures pass quickly through the blender despite the fact that they are subject to change in rheological characteristics on addition of water. The rapid homogeneous mixing and rapid throughput with short residence time, which take place in the blender, make it particularly effective for homogeneously blending particulate solids that undergo changes in flow characteristics during blending. By this method homogeneous mixtures were formed containing roughly 3 to 9 parts by weight of dust to one part by weight of sulfidic concentrate and 2.7 to 13% moisture. Preferably, for optimum improvement in the recovery of metal values, the blender will contain about 3 to 4 parts of dust to one part of sulphided concentrate. The resultant mixtures are particularly suited to forming briquettes. The briquettes can be made directly from the blender effluent mixture without incorporating any additives, using well known methods. Alternatively, the blender mixture can be pelletized directly using a conventional pelletizer.

It is important to note that the effluent material from the blender is characteristically a particulate material with somewhat coarser granules than any of the feed materials. In other words, the dust, concentrate and water tend to agglomerate into discrete particles which retain their shape. The following particle size distribution data, comparing blender feed material and blender effluent, illustrate the capability of the blender to act as an agglomerator. The test data was generated in a 4 inch diameter laboratory blender operating at a top speed of 4,000 feet per minute and treating a feed consisting of one part by weight of sulphides as a 66% solids slurry and 4 parts flue dust. Product moisture was about 10%. The inlet and outlet stage blades had a 60° and 30° pitch respectively. The intermediate blades were arched and had no pitch. Throughputs were about 30 tons per day.

| | Feed | | Product | |
|---|---|---|---|---|
| Mesh | Wt.% | Cumulative Wt.% | Wt.% | Cumulative Wt.% |
| +35 | 0.01 | 0.01 | 10.53 | 10.53 |
| 48 | 0.12 | 0.13 | 7.83 | 18.36 |
| 65 | 0.44 | 0.57 | 8.94 | 27.30 |
| 100 | 1.04 | 1.61 | 6.08 | 33.38 |
| 150 | 1.77 | 3.38 | 7.95 | 41.33 |
| 200 | 2.59 | 5.97 | 9.62 | 50.95 |
| 270 | 2.47 | 8.44 | 7.80 | 58.75 |
| 400 | 4.92 | 13.36 | 8.61 | 67.36 |
| 800 | 16.93 | 30.29 | 9.24 | 76.60 |
| 1600 | 25.29 | 55.68 | 15.71 | 92.31 |
| −1600 | 44.28 | 99.96 | 7.63 | 99.94 |

By this method it was possible to form homogeneous mixtures over the full range of zero to 100% dust or concentrate with moisture from 2.7 to 18%.

In general the particles are substantially spherical and the particle size of the product will vary with the particle size of the feed and with variations in the speed of the blades. Lowering the tip speed of the blades in the blender tend to produce larger effluent particles, but this is accomplished with a sacrifice in blending efficiency. Depending upon the particle size desired, the blender may be operated to give particles of a size which can be further pelleted, or briquetted, or the discrete particles from the blender may be used directly in the next step of a process. For example, if it is desired to feed or recycle dusts to e.g., a smelter, fluid bed reactor, multihearth roaster, rotary kiln, etc., the agglomerated particles from the blender may be fed directly to such processing unit, or may be dried and fed to such processing unit.

In any event the blender of this invention serves to form homogeneous discrete somewhat agglomerated particles consisting of dust, concentrate and moisture and it performs this function on-stream and continuously.

What is claimed is:

1. A blender for a particulate feed comprising an open ended, substantially tubular enclosure having an inlet end and an outlet end and an impeller positioned within the enclosure, the impeller comprising:
   a. a rotatable spindle positioned substantially axially within the enclosure and having blades mounted upon it including,
   b. a first set of blades that are radially extending, positioned relatively close to the inlet end, and pitched to advance the feed toward the outlet end;
   c. a second set of blades that are radially extending, positioned relatively close to the outlet end, and pitched to advance the feed toward the outlet end, the second set of blades having an average pitch less than the pitch of the first set of blades;
   d. a third set of blades containing radially extending and curved blades positioned between the first and second set of blades, said third set of blades including at least one group of blades curved towards the first set of blades and at least one group of blades curved towards the second set of blades.

2. A blender as claimed in claim 1 in which the blades of the first set are all pitched at the same angle and the blades of the second set are all pitched at the same angle.

3. A blender as claimed in claim 2 in which the blades of the first set are pitched at an angle of 25° and those of the second set at an angle of 18°.

4. A blender as claimed in claim 2 in which the blades of the first set are pitched at 45° and those of the second set at 22°.

5. A blender as claimed in claim 2 in which the blades of the first set are pitched at 60° and those of the second set at 30°.

6. A blender as claimed in claim 1 in which there are six blades in the first set, six blades in the second set and eight blades in the third set.

7. A blender as claimed in claim 6 in which two of the blades of the third set are curved towards the first set of blades, two of the blades are curved towards the second set of blades and the remaining four blades extend substantially radially.

8. A blender as claimed in claim 1 in which the blender is positioned to effect an essentially downward flow of the feed.

9. A blender as claimed in claim 1 in which the tip clearance of the radially extending blades from the enclosure is approximately ⅛ of an inch.

10. A blender as claimed in claim 1 in which the spindle is hollow and is provided with radially extending passageways through the spindle into the interior of the tubular enclosure.

11. A method for blending particulate solids in a continuous operation that comprises introducing the solids to be blended into a blender, said blender being comprised of an enclosure having an inner wall, an inlet end and an outlet end and having a impeller disposed therein, and mounted on said impeller at least three discrete sets of rotatable blades each set of blades including members having ends which are in close spacial relationship with the inner wall of said enclosure, the first set of blades being positioned near the inlet end of the enclosure, the second set of blades being positioned near the outlet end of the enclosure and the third set being positioned between the first and second set of blades, said blades exerting propellant, mixing, and shearing action on being activated, and subjecting said solids to a propellant force at the inlet and outlet ends of the enclosure, the propellant force at the outlet end being less than at the inlet end, and shearing and mixing action being exerted under compression between the inlet and outlet ends of the enclosure.

12. A method as claimed in claim 11 in which the solids are introduced into a blender, said blender being an open ended, substantially tubular enclosure having an inlet end and an outlet end and an impeller positioned within the enclosure, the impeller comprising:
   a. a rotatable spindle positioned substantially axially within the enclosure and having blades mounted upon it including,
   b. a first set of blades that are radially extending, positioned relatively close to the inlet end, and pitched to advance the feed toward the outlet end;
   c. a second set of blades that are radially extending, positioned relatively close to the outlet end, and pitched to advance the feed toward the outlet end, the second set of blades having an average pitch less than the pitch of the first set of blades;
   d. a third set of blades containing radially extending and curved blades positioned between the first and second set of blades, said third set of blades including at least one group of blades curved towards the first set of blades and at least one group of blades curved towards the second set of blades.

13. A method as claimed in claim 12 in which the particulate solids are introduced into a blender, the radially extending blades of said blender having a tip clearance from the inner wall of the enclosure of approximately ⅛ of an inch and the rotatable spindle of said blades being hollow and provided with radially extending passageways therethrough into the interior of the tubular enclosure, and water is introduced into the hollow spindle, said water passing through the passageways in the spindle and into the particulate solids during blending.

14. A method as claimed in claim 11 in which the rotatable spindle is driven at a speed such that the tip speed of the blades is greater than 2500 feet per minute.

15. A method as claimed in claim 11 in which the tip speed is 4000 feet per minute.

16. A method as claimed in claim 11 in which water is introduced into the blender with the particulate solids.

17. A method as claimed in claim 16 in which the particulate solids are a mixture of flue dust and a sulphidic concentrate.

* * * * *